United States Patent
Chien

(10) Patent No.: US 7,156,992 B2
(45) Date of Patent: Jan. 2, 2007

(54) WATER TREATMENT DEVICE

(76) Inventor: Yi-Yu Chien, No. 138, Cheng-Ping Fifth Street, Tainan City (TW)

( * ) Notice: Subject to any disclaimer, the term of this patent is extended or adjusted under 35 U.S.C. 154(b) by 399 days.

(21) Appl. No.: 10/732,470

(22) Filed: Dec. 11, 2003

(65) Prior Publication Data

US 2005/0126973 A1 Jun. 16, 2005

(51) Int. Cl.
*C02F 1/48* (2006.01)
*B01D 35/06* (2006.01)

(52) U.S. Cl. .................. 210/223; 210/222; 210/259; 210/260; 210/263; 210/264; 210/283; 210/284; 210/295

(58) Field of Classification Search ............. 210/222, 210/223, 259, 260, 263, 264, 266, 283, 284, 210/295

See application file for complete search history.

(56) References Cited

U.S. PATENT DOCUMENTS 6,312,595 B1 * 11/2001 Chien .................. 210/223

2003/0141234 A1 * 7/2003 Chien .................. 210/223

\* cited by examiner

*Primary Examiner*—David A. Reifsnyder
(74) *Attorney, Agent, or Firm*—Rosenberg, Klein & Lee

(57) ABSTRACT

A water treatment device includes a case having an inlet fitting on an underside thereof and a plurality of cylinders overlapped and received in the case. Each cylinder has a tube received therein and four first ribs connected between the tube and an inner periphery of the cylinder so as to define four first partitions for respectively receiving four curved magnetic pieces therein. Three second ribs are located in each tube and define three second partitions in each tube and each second partition has a plurality of mineral particles received therein. A first one of the three second ribs has an upper notch defined in a top edge thereof and a second one of the three second ribs has a bottom notch defined in a bottom edge thereof. A plurality of holes are defined through an area of the closed end of each cylinder and the area is located between the first one of the three second ribs and a third one of the three second ribs. A water tank is located at a top of a row of the cylinders and has a water permeable closed end. A cover is mounted to the top of the case and has an outlet fitting.

4 Claims, 7 Drawing Sheets

US 7,156,992 B2

WATER TREATMENT DEVICE

FIELD OF THE INVENTION

The present invention relates to a water treatment device that includes several cylinders in which mineral particles are enclosed by curved magnetic pieces so that the mineral substance in the mineral particles is easily solved in the water.

BACKGROUND OF THE INVENTION

How to have clear and healthful water is a serious and common goal for human beings. Some families purchase Reverse Omission water treatment system which blocks benefit mineral substance from the film in the system so that only pure water is obtain which is not an ideal water for the people.

A conventional water purifying device is shown in FIGS. 6 and 7 and generally includes a case 1 in which a plurality of cylinders 2 are received and each cylinder 2 has two separation boards to define three partitions in each cylinder 2. Two magnetic pieces 21 are received in the two outer partitions and mineral particles are received in the middle partitions. The cylinders 2 are overlapped in a longitudinal direction in the case 1 and a water tank 3 is put on a top of the upright row of the cylinders 2. A cover 4 is mounted to the open top of the case 1 and an outlet is connected to the cover 4 and in communication with the water tank 3. Unpurified water is supplied from a bottom of the case 1 and flows through the cylinders 2. The magnetic pieces 21 are helpful for the mineral particles 22 to release minerals in the water which is than collected in the water tank 3. Nevertheless, the number of the magnetic pieces 21 is only two and their magnetic ability becomes weaker and weaker after rushing by the water flow for a long period of time. Some manufacturers wrap the magnetic pieces 21 with plastic films which reduce the direct contact with the water. The plastic films, unfortunately, reduces the efficiency of the magnetic function to the water.

The present invention intends to provide a water treatment system that includes sixteen types of magnetic fields which provide multiple grades of treatment to the water so that the water involves much more minerals than that obtained from the conventional water treatment device.

SUMMARY OF THE INVENTION

The present invention relates to a water treatment device that comprises a case having an inlet fitting connected to an underside thereof and a plurality of cylinders are received in the case along a longitudinal axis of the case. Each cylinder has a tube received therein and four first ribs are connected between an outer periphery of the tube and an inner periphery of the cylinder so as to defined four first partitions that receive four curved magnetic pieces therein. Three second ribs are located in each tube and rested on an interior upper surface of a closed end of each cylinder. The three second ribs are connected along a common edge located at a center of the tube and define three second partitions in each tube so as to receive a plurality of mineral particles therein. A first one of the three second ribs has an upper notch defined in a top edge thereof and a second one of the three second ribs has a bottom notch defined in a bottom edge thereof. A plurality of holes are defined through an area of the closed end of each cylinder and the area is located between the first one of the three second ribs and a third one of the three second ribs. A water tank is located at a top of a row of the cylinders and has a water permeable close end. A cover is mounted to the top of the case and has an outlet fitting.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
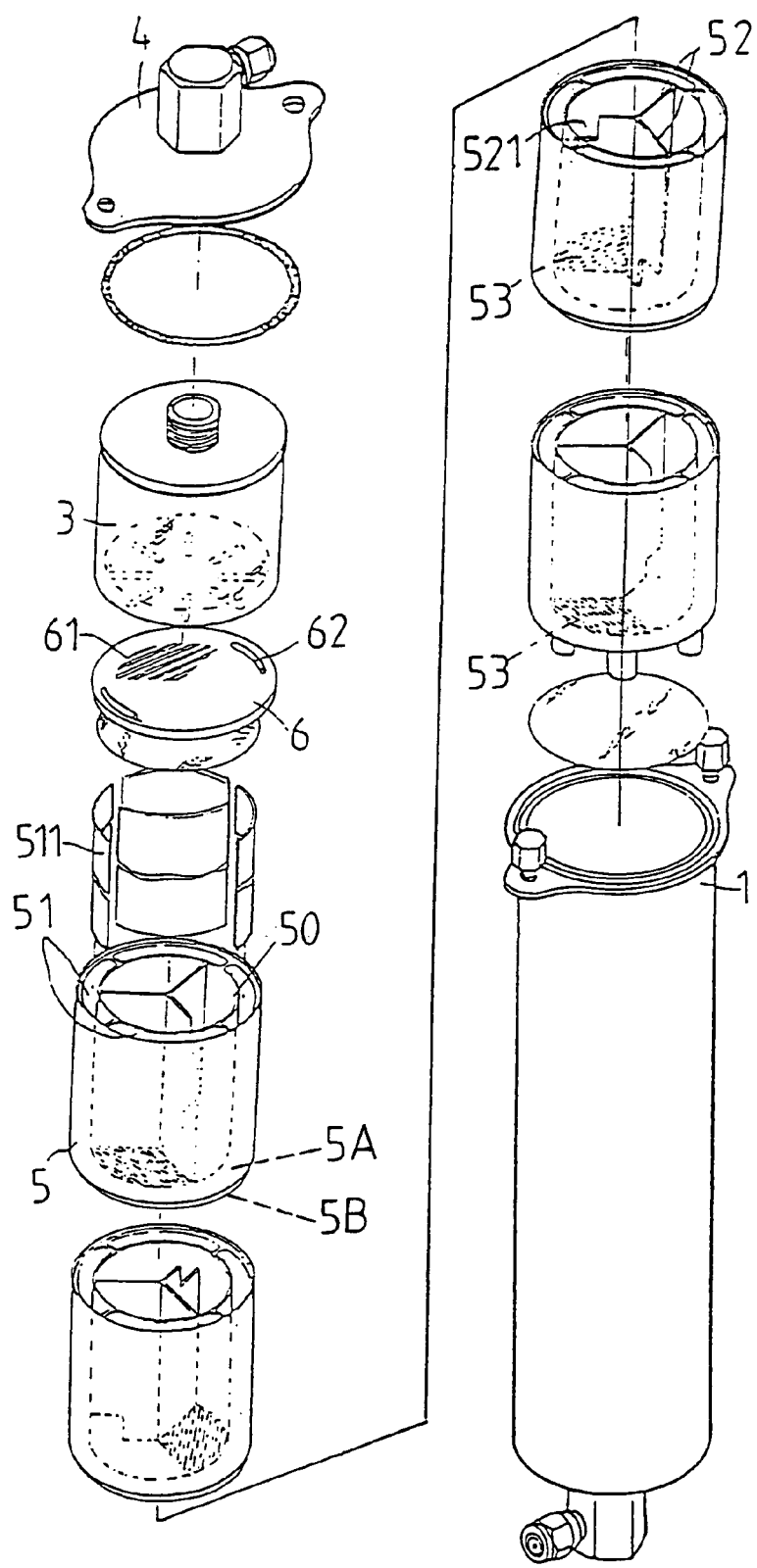
FIG. 1 is an exploded view to show the water treatment device of the present invention.
Figure 2:
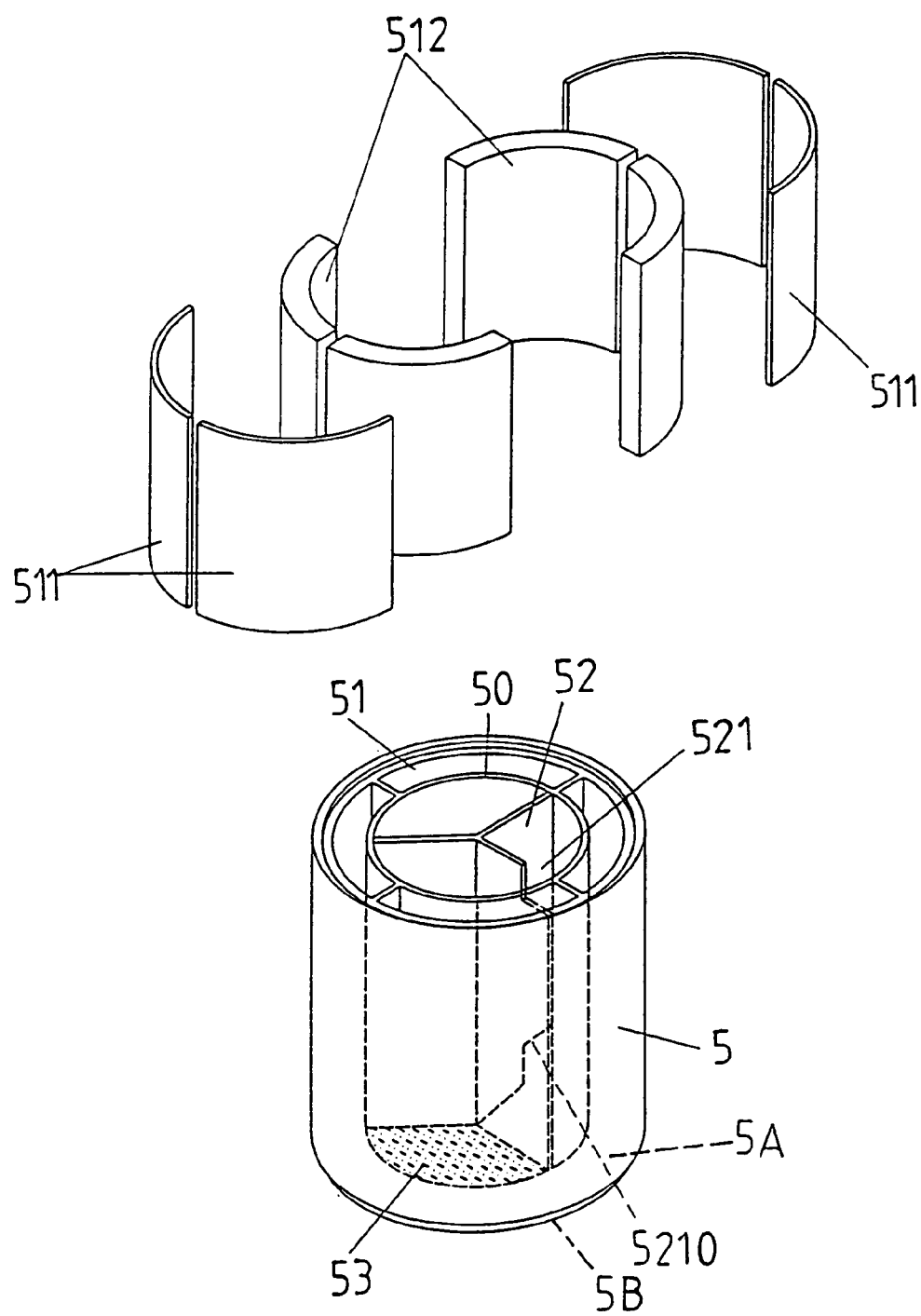
FIG. 2 is an exploded view to show each cylinder and three magnetic pieces to be received in the cylinder of the water treatment device of the present invention.
Figure 3:
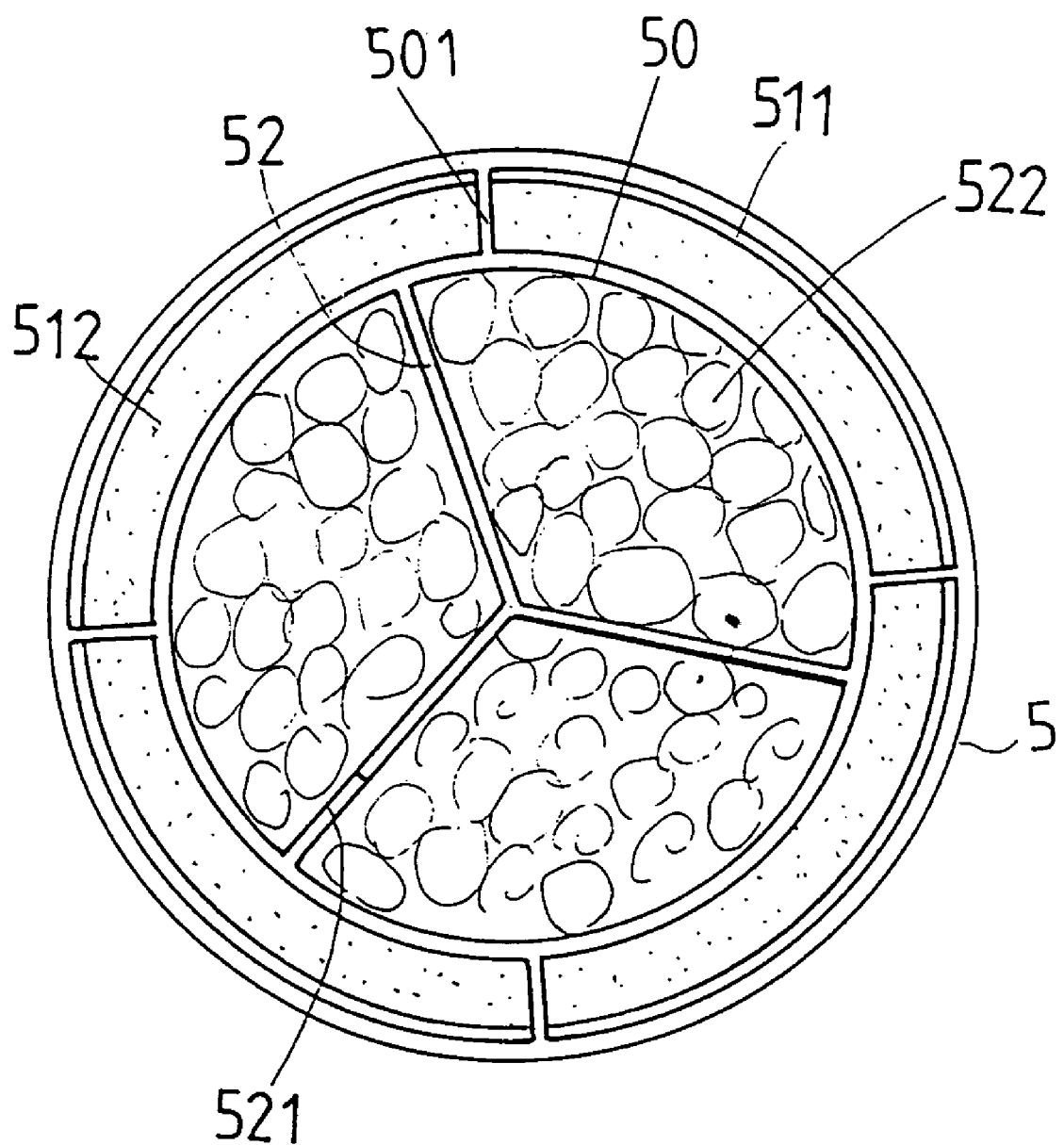
FIG. 3 shows the arrangement of mineral particles and the magnetic pieces in each cylinder.
Figure 4:
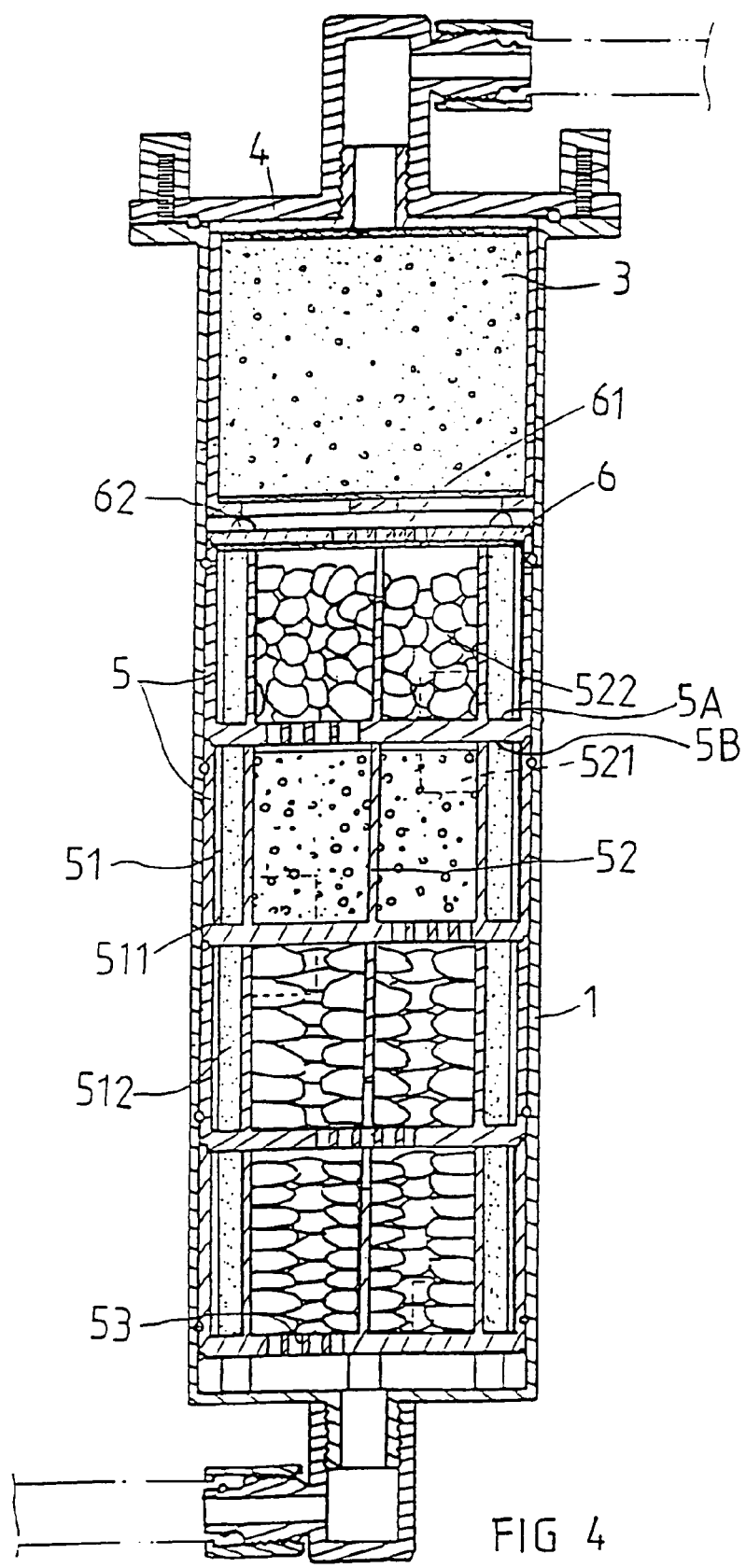
FIG. 4 is a cross sectional view to show the water treatment device of thee present invention.
Figure 5:
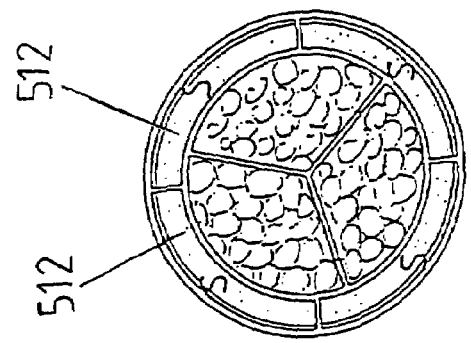
FIG. 5 shows different arrangement of the magnetic poles of the magnetic pieces in each cylinder.
Figure 5:
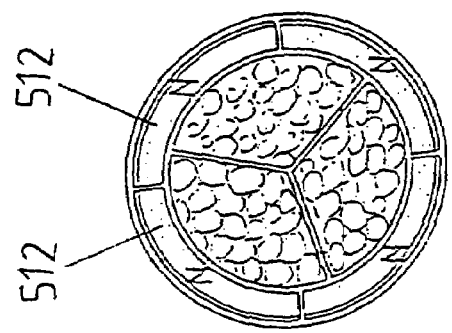
Figure 5:
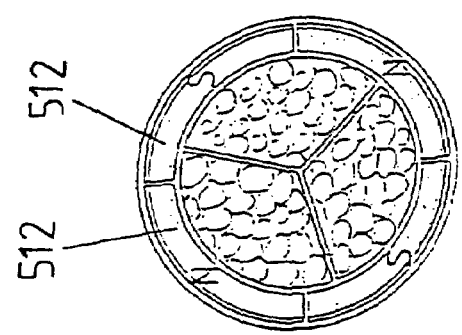
Figure 5:
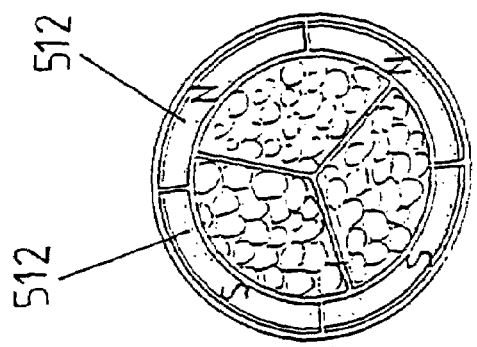
Figure 6:
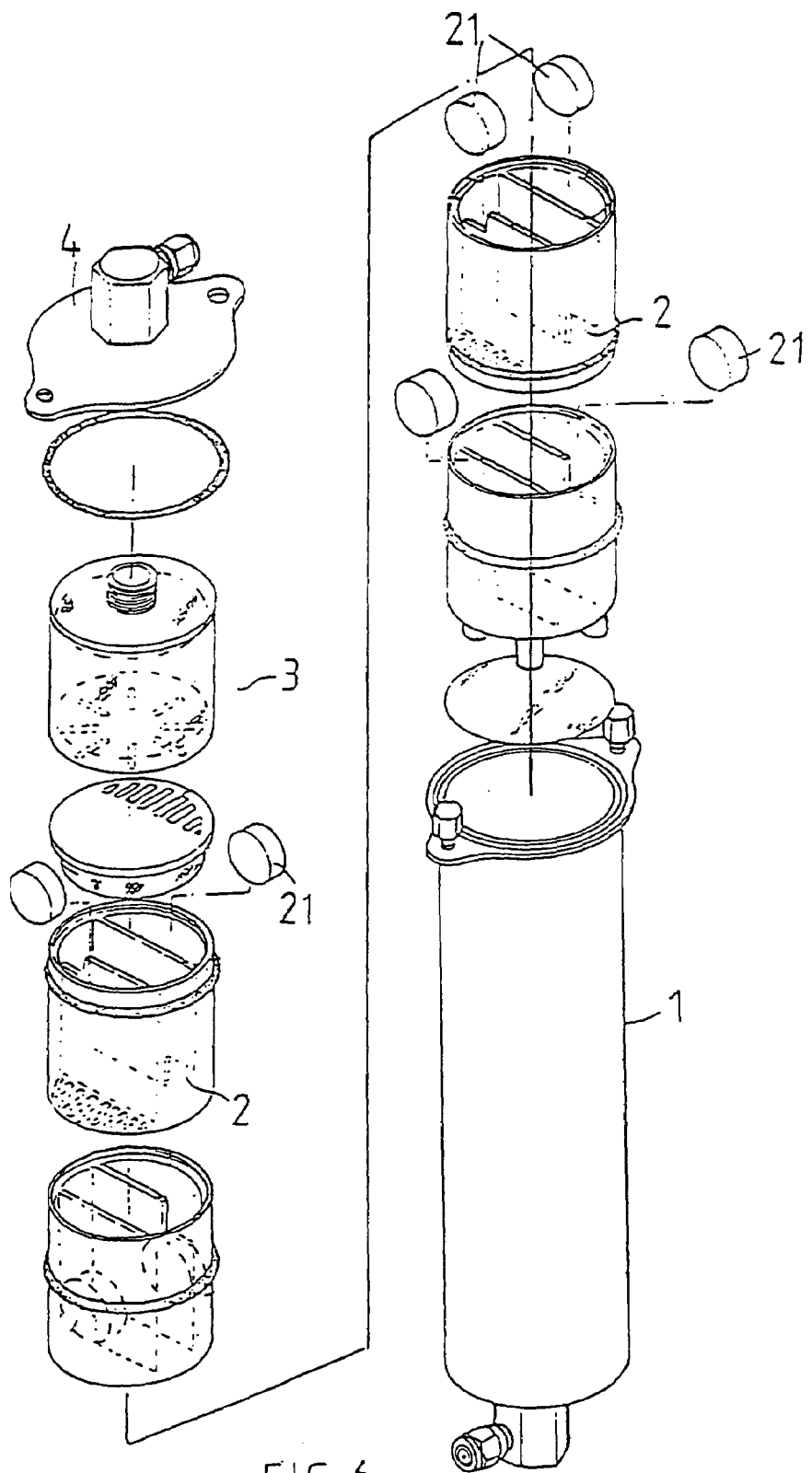
FIG. 6 is an exploded view to show a conventional water treatment device.
Figure 7:
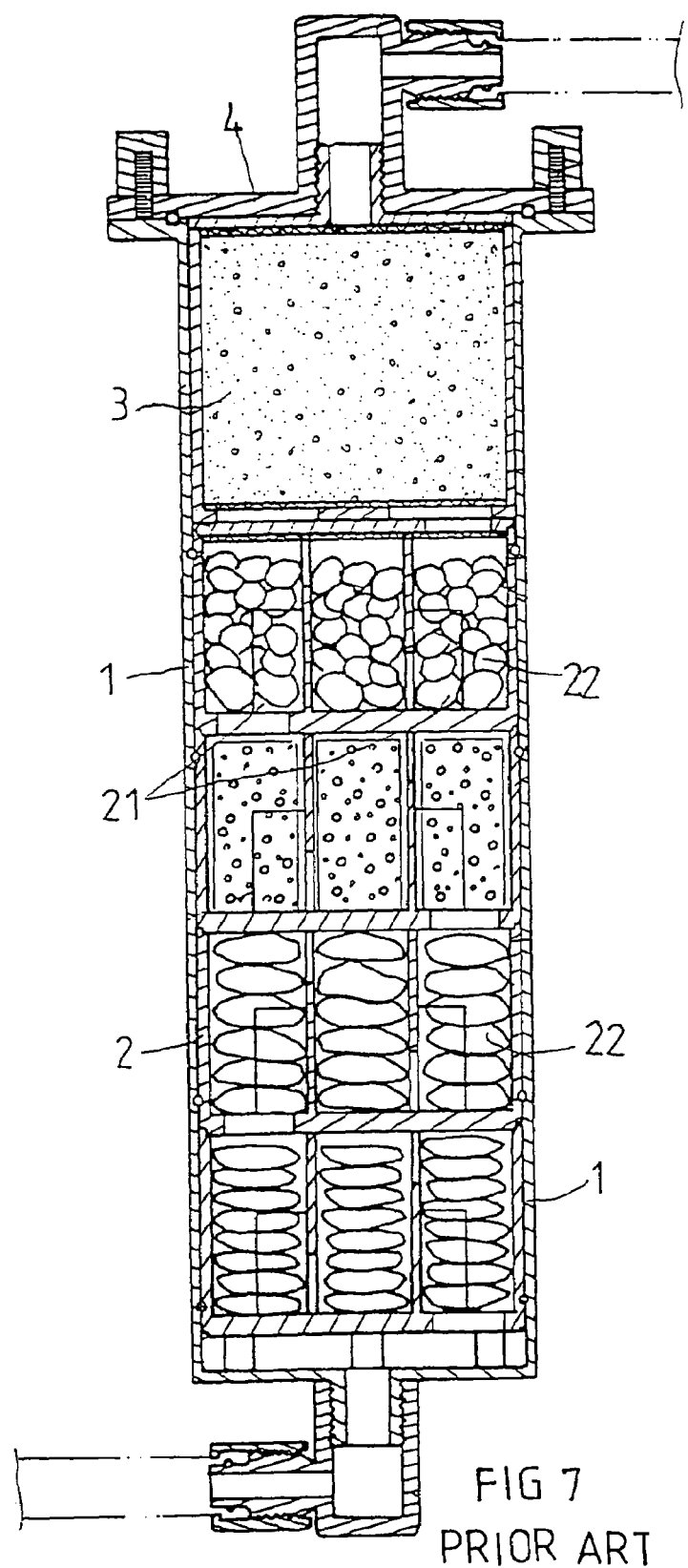
FIG. 7 is a cross sectional view to show the conventional water treatment device.

Referring to FIGS. 1 to 4, the water treatment device of the present invention comprises a tubular case 1 which has an inlet fitting connected to an underside thereof so as to supply water in the device and a plurality of cylinders 5 are overlapped and received in the case 1 along a longitudinal axis of the case 1. Each FIG. 5 shows different arrangement of the magnetic poles of the magnetic pieces in each cylinder 5 has a tube 50 received therein and four first ribs 501 are connected between an outer periphery of the tube 50 and an inner periphery of the cylinder 5 so as to define four first partitions 51. Each first partition 51 has a curved magnetic piece 512 received therein and each curved magnetic piece 512 has a protection sheet 511 attached to an outside thereof so as to prevent the curved magnetic piece 512 from lost of magnetic flux. Three second ribs 52 are located in each tube 50 and rested on an interior upper surface 5A of a closed end 5B of each bulk 5. The three second ribs 52 are connected along a common edge located at a center of the cylinder 5 so that the three second ribs 52 define three second partitions in each tube 50. Each second partition has a plurality of mineral particles 522 received therein.

A first one of the three second ribs 52 has an upper notch 521 defined in a top edge thereof and a second one of the three second ribs 52 has a bottom notch 5210 defined in a bottom edge thereof. A plurality of holes 53 are defined through an area of the closed end of each cylinder 5 and the area is located between the first one of the three second ribs 52 and a third one of the three second ribs 52.

A water tank 3 is located at a top of a row of the cylinders 5 and includes a water permeable closed end. A separation member 6 is located between the water tank 3 and the top of the row of the cylinders 5. The separation member 6 has a plurality of slots 61 defined therethrough and a plurality of ridges 62 extend from a top of the separation member 6. The closed end of the water tank 3 is then supported on the ridges 62 on the separation member 6 and a gap is defined between the water tank 3 and the separation member 6. A cover 4 is mounted to the top of the case 1 and has an outlet fitting connected thereto.

Water is supplied to the device from the inlet fitting of the device and enters the second partition through the holes 53. The water passes through the mineral particles 522 received in the second partition and flows over the upper notch 521 and enter to the next second partition and passes through the mineral particles 522 received therein and enter to the next second partition via the bottom notch 5210. The water goes through each of the cylinders 5 by the way as mentioned above and the magnetic pieces 512 provide multiple grades of magnetic cutting to the water in each cylinder 5 so as to make the mineral particles 522 to release more mineral substances into the water. The water is finally collected in the water tank 3 via the slots 61 of the separation member 6 and is ready to be served via the outlet fitting on the cover 4.

It is to be noted that, as shown in FIG. 5, the magnetic pieces 512 may be arranged in different ways so as to have up to 16 types of arrangement regarding the magnetic poles. This multiple types of arrangement makes the water to be more vigorous than the water obtained from the conventional water treatment device. The area that has holes 53 of the cylinders 5 are arranged not to be located at a straight path, but a spinal path, so that the water has to flow in a curved path from one cylinder 5 and another.

While we have shown and described the embodiment in accordance with the present invention, it should be clear to those skilled in the art that further embodiments may be made without departing from the scope of the present invention.

What is claimed is:

1. A water treatment device comprising:

a case having an inlet fining connected to an underside thereof and a plurality of cylinders received in the case along a longitudinal axis of the case, each cylinder having a tube received therein and four first ribs connected between an outer periphery of the tube and an inner periphery of the cylinder defining four first partitions, each first partition having a curved magnetic piece received therein, three second ribs located in each tube and disposed on an interior upper surface of a closed end of each cylinder, the three second ribs being coupled along a common edge located at a center of the tube, the three second ribs defining three second partitions in each tube and each second partition having a plurality of mineral particles received therein, a first one of the three second ribs having an upper notch defined in a top edge thereof and a second one of the three second ribs having a bottom notch defined in a bottom edge thereof, a plurality of holes defined through an area of the closed end of each cylinder and the area being located between the first one of the three second ribs and a third one of the three second ribs, and a water tank located at a top of a row of the cylinders and having a water permeable closed end, a cover mounted to the top of the case and having an outlet fitting.

2. The device as claimed in claim 1 further comprising a separation member located between the water tank and the top of the row of the cylinders, the separation member having a plurality of slots defined therethrough and a plurality of ridges extending from a top of the separation member, the water permeable closed end of the water tank being supported on the ridges on the separation member.

3. The device as claimed in claim 1, wherein each curved magnetic piece has a protection sheet attached to an outside thereof thereby preventing the curved magnetic piece from losing magnetic flux.

4. The device as claimed in claim 1, wherein the areas of the cylinders having holes being arranged along a spinal path, so that the water flows in a curved path from one cylinder and another.

\* \* \* \* \*